(12) United States Patent
Jeong et al.

(10) Patent No.: US 10,721,460 B2
(45) Date of Patent: Jul. 21, 2020

(54) APPARATUS AND METHOD FOR RENDERING IMAGE

(71) Applicant: Samsung Electronics Co., Ltd., Suwon-si, Gyeonggi-do (KR)

(72) Inventors: Young Ju Jeong, Yongin-si (KR); Yang Ho Cho, Seongnam-si (KR); Dong Kyung Nam, Yongin-si (KR); Du-Sik Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 313 days.

(21) Appl. No.: 14/591,184

(22) Filed: Jan. 7, 2015

(65) Prior Publication Data

US 2016/0037153 A1 Feb. 4, 2016

(30) Foreign Application Priority Data

Jul. 29, 2014 (KR) .................. 10-2014-0096251

(51) Int. Cl.
*H04N 13/02* (2006.01)
*H04N 13/282* (2018.01)
(Continued)

(52) U.S. Cl.
CPC ......... *H04N 13/282* (2018.05); *H04N 13/111* (2018.05); *H04N 13/128* (2018.05);
(Continued)

(58) Field of Classification Search
CPC ........... H04N 13/0011; H04N 13/0022; H04N 13/0228; H04N 13/0282; H04N 13/0296; H04N 13/0404; H04N 13/0415
See application file for complete search history.

(56) References Cited

U.S. PATENT DOCUMENTS

| | | |
|---|---|---|
| 7,746,377 B2 | 6/2010 | Ito et al. |
| 8,582,865 B2 | 11/2013 | Hoctor et al. |

(Continued)

FOREIGN PATENT DOCUMENTS

| | | |
|---|---|---|
| CN | 1591175 A | 3/2005 |
| CN | 101803395 A | 8/2010 |

(Continued)

OTHER PUBLICATIONS

Levoy, M., et al., "Light Field Rendering," Computer Graphis Proceedings, Annual Conference Series, pp. 31-42, Aug. 4-9, 1996.

(Continued)

*Primary Examiner* — Md N Haque
(74) *Attorney, Agent, or Firm* — Harness, Dickey & Pierce, P.L.C.

(57) ABSTRACT

An image rendering apparatus and method for rendering a stereoscopic image are provided. The image rendering apparatus may estimate a disparity of an image pixel included in an input image. Based on the disparity, a viewpoint direction of the image pixel may be determined by the image rendering apparatus. The image rendering apparatus may render a stereoscopic image by assigning a pixel value of the image pixel to a display pixel having a viewpoint direction corresponding to the viewpoint direction of the image pixel, instead of generating a multiview image.

27 Claims, 9 Drawing Sheets

(51) Int. Cl.
*H04N 13/128* (2018.01)
*H04N 13/229* (2018.01)
*H04N 13/296* (2018.01)
*H04N 13/111* (2018.01)
*H04N 13/317* (2018.01)
*H04N 13/305* (2018.01)

(52) U.S. Cl.
CPC ......... *H04N 13/229* (2018.05); *H04N 13/296* (2018.05); *H04N 13/305* (2018.05); *H04N 13/317* (2018.05)

(56) References Cited

U.S. PATENT DOCUMENTS

| | | | | |
|---|---|---|---|---|
| 2004/0252374 | A1* | 12/2004 | Saishu | G02B 27/2214 359/462 |
| 2006/0066612 | A1* | 3/2006 | Yang | G06T 15/205 345/419 |
| 2006/0193510 | A1* | 8/2006 | Matsumoto | G06T 15/06 382/154 |
| 2012/0105597 | A1* | 5/2012 | Tajiri | G03B 35/02 348/49 |
| 2012/0139902 | A1* | 6/2012 | Fujisawa | H04N 13/111 345/419 |
| 2013/0135448 | A1 | 5/2013 | Nagumo et al. | |
| 2013/0141550 | A1* | 6/2013 | Pockett | G03B 35/08 348/51 |
| 2013/0307853 | A1 | 11/2013 | Chang et al. | |
| 2014/0300711 | A1* | 10/2014 | Kroon | H04N 13/302 348/51 |

FOREIGN PATENT DOCUMENTS

| | | |
|---|---|---|
| CN | 102572468 A | 7/2012 |
| CN | 102835116 A | 12/2012 |
| CN | 103918257 A | 7/2014 |
| JP | 2009-147508 A | 7/2009 |
| JP | 2012-120109 A | 6/2012 |
| KR | 10-1105244 B1 | 1/2012 |
| KR | 10-2013-0018241 A | 2/2013 |
| KR | 10-2013-0135606 A | 12/2013 |
| WO | WO-2009027691 A1 | 3/2009 |

OTHER PUBLICATIONS

Extended European Search Report dated Nov. 12, 2015.
F. De Sorbier, "Multi-view Rendering using GPU for 3-D Displays" Author manuscript, published in GSTF international journal on computing 1, 1 (2010), 5 pgs.
J. Baek, "Super-resolution for Stereoscopic 3D Image", Korea Computer Graphics Society 2013, 3 pgs.
Chinese Office Action and English translation thereof dated Nov. 1, 2017.
Chinese Office Action dated Jun. 8, 2018 issued in Chinese Application No. 201510170809.3 (English translation provided).
Japanese Office Action dated Aug. 20, 2019 issued in corresponding Japanese Application No. 2015-145009.
Japanese Office Action dated Feb. 12, 2020 issued in Japanese Patent Application No. 2015-145009. English translation provided.

\* cited by examiner

APPARATUS AND METHOD FOR RENDERING IMAGE

CROSS-REFERENCE TO RELATED APPLICATION

This application claims the priority benefit of Korean Patent Application No. 10-2014-0096251, filed on Jul. 29, 2014, in the Korean Intellectual Property Office, the disclosure of which is incorporated herein by reference in its entirety.

BACKGROUND

1. Field

Example embodiments relate to an image processing technology for rendering a stereoscopic image.

2. Description of the Related Art

Displaying a three-dimensional (3D) image in a 3D display apparatus may include a glasses type scheme requiring 3D glasses to view a stereoscopic image or a glassless type scheme of realizing a stereoscopic image. In the glasses type scheme, filtering of a desired image may be performed using polarized light division, time division, wavelength division for differentiating a wavelength of a primary color from the other wavelengths, and the like. In the glassless type scheme, each image may be displayed to be seen from a predetermined and/or desired viewpoint through a parallax barrier, a lenticular lens, and the like. In the glassless type scheme, rays output in different directions from points in a predetermined and/or desired space may be represented through a display without a change. Available images may be acquired at different locations and different angles, and an image suitable for a current viewpoint may be rendered using the acquired images. Typically, to generate a plurality of images to be displayed in the scheme of representing a light field, N intermediate images may be generated based on at least two input images, and 3D image information to be output from pixels of a 3D display apparatus may be determined based on the generated N intermediate images.

SUMMARY

At least one example embodiment relates to an image rendering method for rendering a stereoscopic image to be displayed by a display apparatus including a plurality of display pixels.

According to at least one example embodiment, an image rendering method for rendering a stereoscopic image to be displayed by a display apparatus including a plurality of display pixels, includes estimating a disparity of a selected image pixel included in an input image, and assigning a pixel value of the selected image pixel to a display pixel of the plurality of display pixels, the assigned display pixel having a viewpoint direction corresponding to a viewpoint direction of the selected image pixel.

At least one example embodiment provides that the viewpoint direction of the selected image pixel may be based on the disparity of the selected image pixel.

At least one example embodiment provides that the assigning may include obtaining a first model associated with viewpoint directions of the plurality of display pixels, the viewpoint direction of the assigned display pixel being one of the viewpoint directions of the plurality of display pixels, and obtaining a second model associated with the viewpoint direction of the selected image pixel based on the disparity of the selected image pixel, the assigning is based on the obtained first model and the obtained second model.

At least one example embodiment provides that the first model may be based on a relationship between the viewpoint directions of each of the display pixels and corresponding locations of the plurality of display pixels.

At least one example embodiment provides that the obtaining obtains the second model by modeling a direction of a ray to be output from the selected image pixel based on a location of the selected image pixel in the input image.

At least one example embodiment provides that the assigning may include identifying one of the plurality of display pixels having a same viewpoint direction as the viewpoint direction of the selected image pixel based on a relationship between the obtained first model and the obtained second model, and the assigning assigns the pixel value of the selected image pixel to the identified display pixel.

At least one example embodiment provides that the determining may include determining a display pixel to which a pixel value of each of a plurality of image pixels is to be assigned, using the first model and second models associated with the image pixels and that the image pixels may be located adjacent to each other.

At least one example embodiment provides that assigning may include interpolating pixel values of the plurality of image pixels and assigning one of the interpolated pixel values to the assigned display pixel.

At least one example embodiment provides that each of the plurality of display pixels may have one of a number of different viewpoint directions.

At least one example embodiment relates to a display apparatus.

According to at least one example embodiment, a display apparatus includes a display configured to display a stereoscopic image using a plurality of display pixels, each of the plurality of display pixels having a corresponding viewpoint direction, and an image renderer configured to render the stereoscopic image by assigning a pixel value of a selected image pixel in an input image to a display pixel of the plurality of display pixels based on a viewpoint direction of the image pixel.

At least one example embodiment provides that the image renderer may be configured to determine the assigned display pixel using a first model associated with viewpoint directions of the plurality of display pixels, respectively, and a second model associated with the viewpoint direction of the selected image pixel.

At least one example embodiment provides that the selected image pixel is one of a plurality of image pixels and the second model associated with the viewpoint direction of the selected image pixel is one of a plurality of second models associated with the plurality of image pixels, and the image renderer may be configured to determine the assigned display pixel using the first model and the plurality of second models.

At least one example embodiment relates to an image rendering apparatus.

According to at least one example embodiment, an image rendering apparatus includes a disparity estimator configured to estimate a disparity of a selected image pixel included in an input image, and an image renderer configured to render a stereoscopic image by assigning a pixel value of the selected image pixel to a display pixel, the display pixel having a viewpoint direction corresponding to a viewpoint direction of the selected image pixel.

At least one example embodiment provides that the viewpoint direction of the selected image pixel may be based on the disparity of the image pixel, and that the display pixel may have a predetermined and/or desired viewpoint direction.

At least one example embodiment provides that the image renderer may be configured to search a plurality of display pixels to which the pixel value of the image pixel is to be assigned from among a plurality of display pixels, based on the viewpoint direction of the selected image pixel and a viewpoint direction of each of the plurality of display pixels, the assigned display pixel being one of the plurality of display pixels.

At least one example embodiment discloses a display apparatus including a display including a plurality of display pixels and a processor configured to obtain a first model associated with locations and viewpoint directions of the plurality of display pixels, receive image data for corresponding image pixels, obtain a second model associated with a disparity of at least one of the image pixels, and apply a display value to at least one of the plurality of display pixels based on the first and second model.

In at least one example embodiment, the processor is configured to generate a 3D display based on the display value.

In at least one example embodiment, the second model is a singular linear function, the processor is configured to apply the singular linear function to the first model, determine at least one intersection of the first model and the second model, and apply the display value based on the at least one intersection.

In at least one example embodiment, the at least one intersection is associated with one of the plurality of display pixels.

In at least one example embodiment, the display pixels are associated with viewpoint directions and the first model includes a plurality of intermediate functions, each intermediate function is associated with one of the viewpoint directions.

In at least one example embodiment, the processor is configured to assign the display value without generating a multiview image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
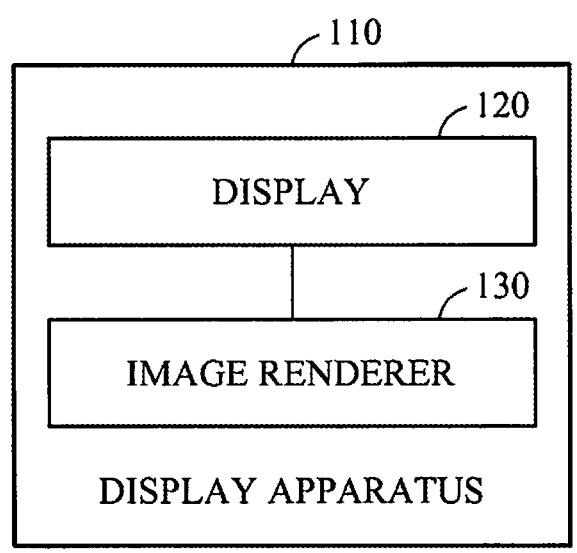
FIG. 1 illustrates a display apparatus according to at least one example embodiment.

Reference will now be made in detail to embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a display apparatus 110 according to at least one example embodiment.

The display apparatus 110 may receive an input image, and may display a stereoscopic image, or a three-dimensional (3D) image. The display apparatus 110 may display a stereoscopic image using a scheme of representing a ray distribution or a light field corresponding to a desired stereoscopic image. For example, the display apparatus 110 may represent a distribution of rays on a display surface for each location and each direction of the rays, and may realize a stereoscopic image.

The display apparatus 110 may be a 3D television (TV), a 3D smartphone, a 3D tablet, or a 3D digital information display (DID), for example.

The display apparatus 110 may use an optical member, for example a lenticular lens, to realize a stereoscopic image. For example, the display apparatus 110 may output different images to a left eye and a right eye of a user, by refraction of light through the lenticular lens, and the user may perceive a stereoscopic effect based on a difference in viewpoint between an image seen by the left eye and an image seen by the right eye.

In an example, the display apparatus 110 may receive a color image as the input image together with a depth image corresponding to the color image. The depth image may include depth information indicating a distance between a subject and a location at which an image is captured. In another example, the display apparatus 110 may receive a color image as the input image together with a reference image captured from a viewpoint different from a viewpoint of the color image. The reference image may refer to an image captured from a viewpoint different from a viewpoint of the input image and may include at least one image.

To display a stereoscopic image, the display apparatus 110 may directly render the stereoscopic image, instead of generating a multiview image. The display apparatus 110 may directly assign a pixel value of an image pixel in the input image to each of display pixels, based on viewpoint information of each of the display pixels and disparity information of the image pixel. The viewpoint information may include, for example, location information, and viewpoint direction information of each of the display pixels. The display apparatus 110 may directly match a pixel value of a stereoscopic image to a display pixel, instead of generating a multiview image as an intermediate image and accordingly, complexity and an amount of resources required for rendering of a stereoscopic image may be reduced.

Referring to FIG. 1, the display apparatus 110 may include a display 120, and an image renderer 130.

The image renderer 130 may be hardware, firmware, hardware executing software or any combination thereof. When the image renderer 130 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the image renderer 130. CPUs, DSPs, ASICs and FPGAs may generally be referred to as processors and/or microprocessors.

In the event where image renderer 130 is a processor executing software, the processor is configured as a special purpose machine to execute the software, stored in a storage medium, to perform the functions of the image renderer 130. In such an embodiment, the processor may include one or more Central Processing Units (CPUs), digital signal processors (DSPs), application-specific-integrated-circuits (ASICs), field programmable gate arrays (FPGAs) computers.

The display 120 may include a plurality of display pixels. Each of the display pixels may include, for example, red (R), green (G), and blue (B) subpixels. Additionally, the display 120 may include a lenticular lens to realize a stereoscopic image. The lenticular lens may be located above the display pixels. Rays radiated from the display pixels may be refracted by the lenticular lens, or may pass through the lenticular lens.

Each of the display pixels in the display 120 may have a predetermined and/or desired viewpoint direction. The display 120 may display a stereoscopic image using the viewpoint directions of the display pixels. A viewpoint direction of each of the display pixels is based on the lenticular lens. Due to a structural characteristic of the lenticular lens, viewpoint directions may be periodic and/or repeated for each group of display pixels. A travel path of each of ray radiated from the display pixels may be based on the structural characteristic of the lenticular lens.

For example, the travel path may be based on a distance between the lenticular lens and a display pixel corresponding to the ray, a tilt and a pitch of the lenticular lens, a characteristic of a lenticule by which rays are refracted, and the like. A ray radiated from the corresponding display pixel may be refracted by the lenticular lens or may pass through the lenticular lens, and may travel toward a predetermined and/or desired location in a 3D space. A direction that the ray travels may correspond to the viewpoint direction of the display pixel.

A viewpoint direction of each of the display pixels may be determined and/or selected in advance during designing of the display apparatus 110. The display pixels may have a single viewpoint direction among a predetermined and/or desired number of different viewpoint directions. For example, the display apparatus 110 may express a first viewpoint direction to an N-th viewpoint direction, and each of the display pixels in the display apparatus 110 may have a single viewpoint direction among the first viewpoint direction to the N-th viewpoint direction. In this example, N may be a natural number greater than "1."

The image renderer 130 may render a stereoscopic image to be displayed by the display 120 from the input image. The input image may include a plurality of image pixels. A viewpoint direction of each of the image pixels may be determined based on a disparity of each of the image pixels. The disparity may refer to a distance or a difference in viewpoints between corresponding image pixels in a stereo image including a left image and a right image. For example, an input image may correspond to a left image, and a disparity of each of the image pixels in the left image may be determined based on a corresponding relationship between the left image and a right image corresponding to the left image.

The image renderer 130 may estimate a disparity of each of the image pixels in the input image. A viewpoint direction of each of the image pixels may be determined based on the estimated disparity. A disparity function associated with rays output from the image pixels may be determined for each of the image pixels. The disparity function may represent a light field expression expressed by an image pixel and a disparity of the image pixel.

In an example, the display apparatus 110 may receive a left image and a right image as an input image and as a reference image, respectively. The display apparatus 110 may receive a stereo image including the left image and the right image, and the image renderer 130 may render a stereoscopic image based on the stereo image. The reference image may refer to an image acquired by capturing the same subject as a subject of an input image from a viewpoint different from a viewpoint of the input image. The image renderer 130 may estimate a disparity of an image pixel based on a difference in viewpoint between the input image and the reference image. For example, the image renderer 130 may estimate depth information through stereo matching between the left image and the right image, and may estimate a disparity of each of image pixels in the input image from the depth information. The stereo matching may refer to a scheme of acquiring depth information based on a distance or a difference in viewpoint between corresponding image pixels in the stereo image.

In another example, the display apparatus 110 may receive a color image and a depth image as an input image and as a disparity image, respectively. The image renderer 130 may identify depth information of a predetermined and/or selected image pixel in the color image from the depth image, and may estimate a disparity of the predetermined and/or selected image pixel based on the identified depth information.

The image renderer 130 may assign a pixel value (or a color value) of an image pixel in the input image to one or more display pixels (or a location in a stereoscopic image), and may render the stereoscopic image. The assigned one or more display pixels may be determined based on a viewpoint direction of the image pixel. When a disparity of the image pixel is estimated, the image renderer 130 may determine a first model associated with a viewpoint direction of each of the display pixels, and a second model associated with the viewpoint direction of the image pixel.

The first model may represent a function associated with a viewpoint direction or a viewpoint location of each of rays output from the display pixels, as a light field function represented by the display apparatus 110. Viewpoint information on a viewpoint direction of each of the display pixels may be stored in advance in a memory storage device, and the image renderer 130 may determine the first model based on the viewpoint information. For example, the first model may be determined by the renderer 130 based on a viewpoint direction of each of display pixels included in either a vertical line or a horizontal line among the display pixels in the display 120.

The second model may represent a function associated with a viewpoint direction or a viewpoint location of a ray output from the image pixel, as a light field function represented by the image pixel. The viewpoint direction or the viewpoint location may be determined by the image renderer 130 based on a disparity of the image pixel. The second model may be determined by the image renderer 130 for each image pixel.

The image renderer 130 may determine a display pixel to which the pixel value of the image pixel is to be assigned, based on the first model and the second model. For example, the image renderer 130 may determine a display pixel to which a pixel value of an image pixel is to be assigned, based on a corresponding relationship between the first model and the second model, may assign a pixel value of a predetermined and/or selected image pixel for the second model to the determined display pixel, and may render a stereoscopic image. Accordingly, to display a stereoscopic image, the image renderer 130 may directly generate the stereoscopic image, instead of using a multiview image.

The image renderer 130 may determine the first model, based on location information and viewpoint direction information of each of display pixels located in a predetermined and/or selected line. The image renderer 130 may set a plurality of reference points representing a corresponding relationship between a location and a viewpoint direction (or a viewpoint location) of a display pixel, may determine an intermediate function passing through the set reference points, and may determine the first model. For example, the image renderer 130 may determine, as an intermediate function, a set of linear functions that pass through the reference points and that have the same slopes.

The reference points may be set for each of display pixels located in either a vertical line or a horizontal line among all the display pixels included in the display apparatus 110. For example, the reference points may be set for each of display pixels located in either a row or a column among all the display pixels in the display apparatus 110.

The image renderer 130 may determine the second model based on the disparity of the image pixel. The image renderer 130 may determine a disparity function associated with a viewpoint direction of a ray output from the image pixel, and may determine the second model. The disparity function may be determined for each image pixel.

The image renderer 130 may determine an intersecting point between the intermediate function and the disparity function, and may determine one or more display pixels to which a pixel value of an image pixel is to be assigned, based on the intersecting point. For example, the image renderer 130 may determine a reference point located closest to the intersecting point among the reference points included in the intermediate function, and may assign the pixel value of the image pixel to a display pixel corresponding to the determined reference point.

For example, when a reference point R is located closest to an intersecting point between an intermediate function and a disparity function Q of an image pixel P, the image renderer 130 may assign a pixel value of the image pixel P to a display pixel K corresponding to the reference point R. When a stereoscopic image is displayed, the pixel value of the image pixel P may be output through the display pixel K.

Additionally, the image renderer 130 may render a stereoscopic image using a plurality of second models. The image renderer 130 may determine a display pixel to which a pixel value of each of a plurality of image pixels is to be assigned, based on a disparity function of each of the image pixels. The image renderer 130 may set a plurality of reference points representing a corresponding relationship between a location and a viewpoint direction of a display pixel, and may determine an intermediate function passing through the reference points. The image renderer 130 may determine a disparity function of each of the image pixels located adjacent to each other. The image renderer 130 may identify a reference point of the intermediate function included in a region between a plurality of disparity functions, may interpolate pixel values of the image pixels, and may assign a pixel value obtained by interpolating the pixel values to a display pixel corresponding to the identified reference point.

For example, the image renderer 130 may determine a disparity function B associated with an image pixel A, and a disparity function D associated with an image pixel C, and may identify a reference point of the intermediate function included in a region between the disparity functions B and D. The image renderer 130 may interpolate a pixel value of the image pixel A and a pixel value of the image pixel C, and may assign a pixel value obtained by interpolating the pixel values to a display pixel corresponding to the identified reference point.

The first model may be defined based on display pixels located in either a horizontal line or a vertical line among all the display pixels in the display 120. The second model may be defined for one of image pixels in a location corresponding to a line in which the display pixels are located. For example, when the first model is determined for display pixels located in an i-th row among the display pixels in the display 120, the second model may be determined for each of image pixels in a location corresponding to the i-th row.

The image renderer 130 may repeatedly perform the above process on image pixels and display pixels located in another line and accordingly, a stereoscopic image to be displayed by the display 120 may be generated.

Figure 2:
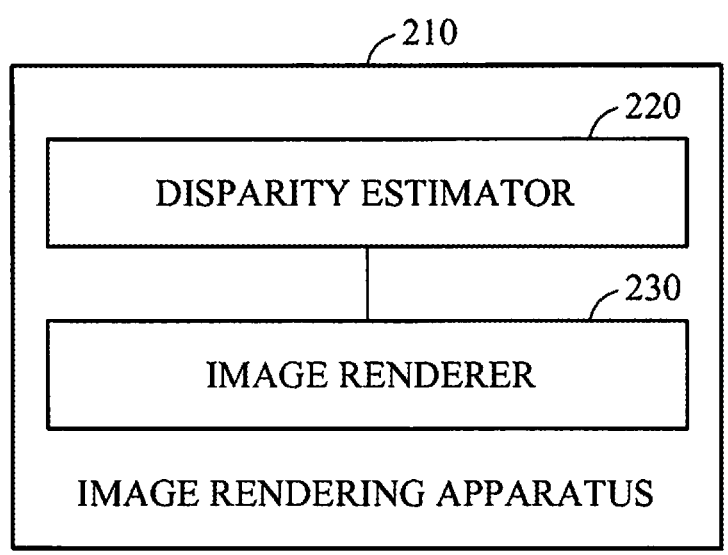
FIG. 2 illustrates an image rendering apparatus according to at least one example embodiment.

FIG. 2 illustrates an image rendering apparatus 210 according to at least one example embodiment. The image rendering apparatus 210 may be the image renderer 130.

The image rendering apparatus 210 may render a stereoscopic image. To render a stereoscopic image, the image rendering apparatus 210 may generate the stereoscopic image by directly assigning a pixel value of an image pixel to a display pixel, instead of generating a multiview image. The image rendering apparatus 210 may operate in a 3D rendering apparatus, for example, a 3D television (TV), a 3D smartphone, a 3D tablet, a 3D digital information display (DID), and the like.

Referring to FIG. 2, the image rendering apparatus 210 may include a disparity estimator 220, and an image renderer 230.

The disparity estimator 220 and the image renderer 230 may be hardware, firmware, hardware executing software or any combination thereof. When at least one of the disparity estimator 220 and the image renderer 230 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the disparity estimator 220 and the image renderer 230. CPUs, DSPs, ASICs and FPGAs may generally be referred to as processors and/or microprocessors.

In the event where at least one of the disparity estimator 220 and the image renderer 230 is a processor executing software, the processor is configured as a special purpose machine to execute the software, stored in a storage medium, to perform the functions of the at least one of the disparity estimator 220 and the image renderer 230. In such an embodiment, the processor may include one or more Central Processing Units (CPUs), digital signal processors (DSPs), application-specific-integrated-circuits (ASICs), field programmable gate arrays (FPGAs) computers.

The disparity estimator 220 may estimate a disparity of an image pixel included in an input image. Based on the disparity, a viewpoint direction of the image pixel may be determined by the image renderer 230. In an example, the disparity estimator 220 may estimate a disparity of an image pixel based on a difference in viewpoints between a reference image and the input image that are captured from the different viewpoints. In this example, the disparity estimator 220 may search for image pixels corresponding to the reference image from among all image pixels included in the input image, may calculate a distance between corresponding image pixels in the input image and the reference image, and may acquire an image including distance and/or disparity values between all the image pixels. In another example, the disparity estimator 220 may estimate a disparity of an image pixel based on depth information included in a depth image. The estimated disparity may be expressed in the form of a depth map or a disparity map.

The image renderer 230 may assign a pixel value of the image pixel to one or more display pixels, and may render a stereoscopic image. Each of the display pixels may have a viewpoint direction corresponding to the viewpoint direction of the image pixel. The display pixels may each have a predetermined and/or desired viewpoint direction, or may have one of a predetermined number of different viewpoint directions. A viewpoint direction of each of the display pixels may be based on a structural characteristic of a lenticular lens included in a display apparatus for displaying a stereoscopic image. A travel path of each of rays radiated from the display pixels may be based on the structural characteristic of the lenticular lens.

The image renderer 230 may search for display pixels to which a pixel value of an image pixel is to be assigned from among a plurality of display pixels, based on a viewpoint direction of each of the image pixel and the display pixels. The image renderer 230 may directly render a stereoscopic image, based on a first model associated with the viewpoint direction of each of the display pixels and a second model associated with the viewpoint direction of the image pixel, instead of using a multiview image.

The image renderer 230 may determine the first model. In an example, the image renderer 230 may determine the first model based on a corresponding relationship between a location and a viewpoint direction of each of the display pixels. In another example, the image renderer 230 may determine the first model based on a corresponding relationship between a location of each of display pixels arranged in a display panel and a viewpoint direction assigned to each of the display pixels. In still another example, the image renderer 230 may set a plurality of reference points representing a corresponding relationship between a location and a viewpoint direction of a display pixel, may determine an intermediate function passing through the set reference points, and may determine the first model.

The image renderer 230 may determine the second model based on the disparity estimated by the disparity estimator 220. The image renderer 230 may perform modeling of a direction of a ray to be output from the image pixel based on a location of the image pixel in the input image, and may determine the second model. The image renderer 230 may determine, as the second model, a disparity function associated with a viewpoint direction of the ray output from the image pixel. The disparity function may be determined for each image pixel.

The image renderer 230 may determine one or more display pixels to which the pixel value of the image pixel is to be assigned, based on the first model and the second model. For example, the image renderer 230 may determine a display pixel to which a pixel value of an image pixel is to be assigned, based on a corresponding relationship between the first model and the second model, may assign a pixel value of a predetermined and/or selected image pixel for the second model to the determined display pixel, and may render a stereoscopic image.

The image renderer 230 may determine an intersecting point between an intermediate function and a disparity function, and may determine one or more display pixels to which a pixel value of an image pixel is to be assigned, based on the intersecting point. In an example, the image renderer 230 may determine a reference point located closest to the intersecting point among reference points included in the intermediate function, and may assign the pixel value of the image pixel to a display pixel corresponding to the determined reference point. In another example, the image renderer 230 may identify a reference point included in a pixel region determined based on the disparity of the image pixel, and may assign the pixel value of the image pixel to a display pixel corresponding to the identified reference point.

Additionally, the image renderer 230 may determine one or more display pixels to which a pixel value of each of a plurality of image pixels is to be assigned, based on the first model and second models associated with the image pixels. The image pixels may be located adjacent to each other. The image renderer 230 may determine a display pixel to which the pixel value is to be assigned, based on a disparity function of each of the image pixels. The image renderer 230 may set a plurality of reference points representing a corresponding relationship between a location and a viewpoint direction of a display pixel, and may determine an intermediate function passing through the reference points. The image renderer 230 may determine a disparity function of each of the image pixels. The image renderer 230 may identify a reference point of the intermediate function included in a region between a plurality of disparity functions, may interpolate pixel values of the image pixels, and may assign a pixel value obtained by interpolating the pixel values to a display pixel corresponding to the identified reference point. For example, when a plurality of reference points are identified, the image renderer 230 may interpolate the pixel values of the image pixels, and may assign a pixel value obtained by interpolating the pixel values to display pixels corresponding to the identified reference points.

Figure 3:
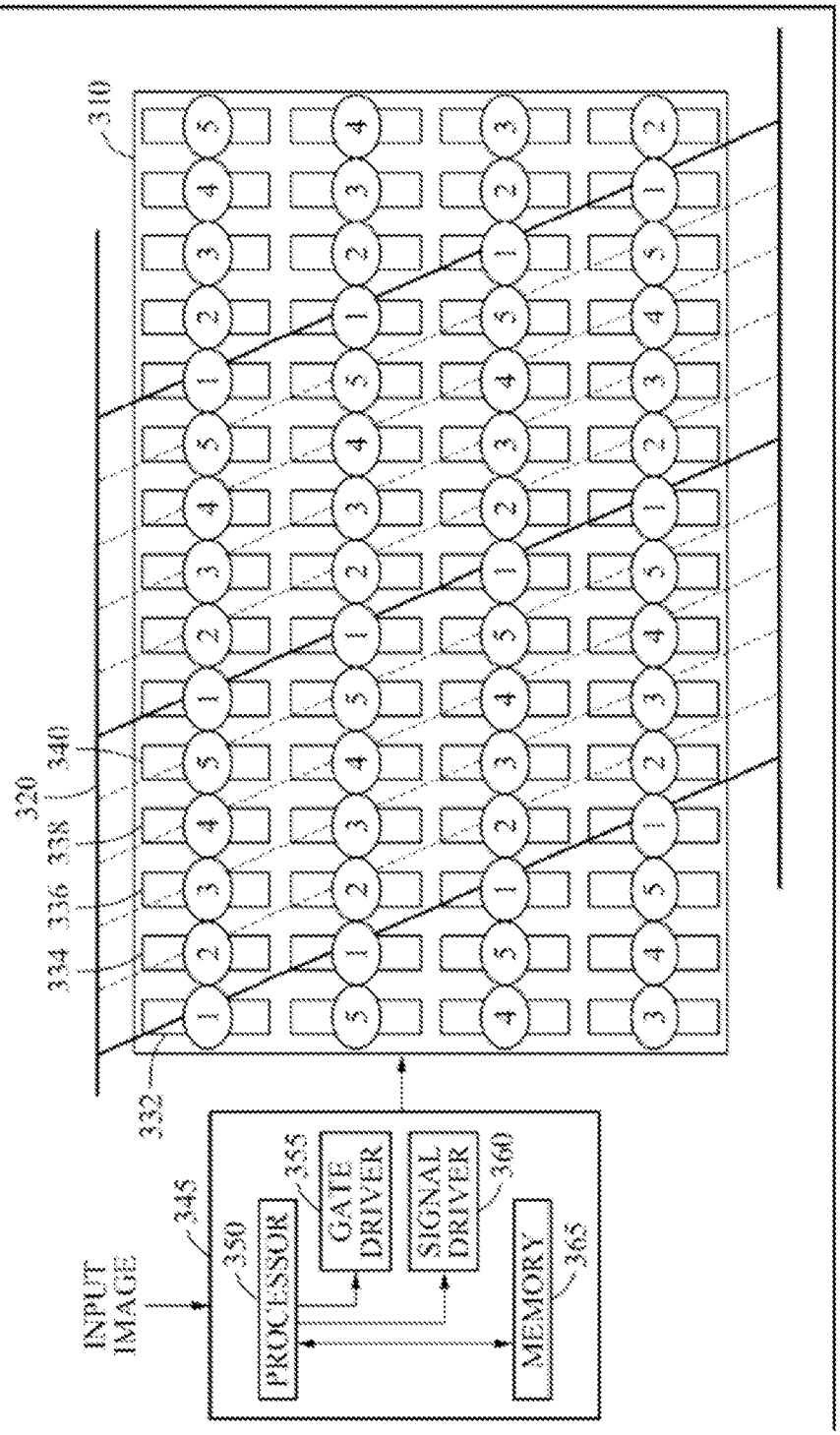
FIG. 3 illustrates a viewpoint direction of a display pixel according to at least one example embodiment.

FIG. 3 illustrates a viewpoint direction of a display pixel according to at least one example embodiment.

Referring to FIG. 3, a display panel 310 of a display apparatus for displaying a stereoscopic image may include a plurality of display pixels, for example, display pixels 332, 334, 336, 338, and 340. Numbers 1-5 within the pixels 332, 334, 336, 338 and 340 represent corresponding viewing directions. Each of the display pixels 332, 334, 336, 338 and 340 may include, for example, subpixels R, G, and B. To realize a stereoscopic image, the display apparatus may include a lenticular lens 320, in addition to the display panel 310. The lenticular lens 320 may be located above the display panel 310.

The lenticular lens 320 may include a plurality of lenticules, and may be tilted in a diagonal direction. Rays output from the display pixels 332 to 340 may be refracted by the lenticular lens 320 or may pass through the lenticular lens 320, and may travel to a predetermined and/or desired location in a 3D space. A travel path of each of the rays may be determined based on a structural characteristic of the lenticular lens 320 and accordingly, each of the display pixels 332, 334, 336, 338 and 340 may have a predetermined and/or desired viewpoint direction.

For each of the display pixels 332, 334, 336, 338 and 340, pixel information that indicates a viewpoint direction may be based on the lenticular lens 320. For example, the display pixels 332, 334, 336, 338 and 340 output pixel information of a first viewpoint direction, pixel information of a second viewpoint direction, pixel information of a third viewpoint direction, pixel information of a fourth viewpoint direction, and pixel information of a fifth viewpoint direction, respectively.

A ray output from the display pixel 332 may travel in the first viewpoint direction through the lenticular lens 320, and a ray output from the display pixel 334 may travel in the second viewpoint direction through the lenticular lens 320. Similarly, a ray output from the display pixel 336 may travel in the third viewpoint direction through the lenticular lens 320, a ray output from the display pixel 338 may travel in the fourth viewpoint direction through the lenticular lens 320, and a ray output from the display pixel 340 may travel in the fifth viewpoint direction through the lenticular lens 320.

Due to the structural characteristic of the lenticular lens 320, a viewpoint direction of each of the display pixels may have periodicity or repeatability. For example, display pixels located in a single column of the display panel 310 may have a pattern in which the first viewpoint direction to the fifth viewpoint direction are continuously repeated, as shown in FIG. 3.

A viewpoint direction of each of the display pixels in the display panel 310 may be determined in advance during designing of the display apparatus, and information regarding the viewpoint direction may be stored in a memory storage device. An image rendering apparatus (e.g., 210) may determine a first model based on information on the display pixels. For example, the information on the display pixels may include information on a location of each of the display pixels on the display panel 310, and viewpoint direction information of each of the display pixels.

Moreover, as shown in FIG. 3, an image processing circuit 345 receives the input image and assigns pixel values of the image pixels in the input image to the display pixels 332, 334, 336, 338 and 340. The image processing circuit 345 then supplies the assigned pixel values to the display pixels 332, 334, 336, 338 and 340 using a processor 350, gate driver, 355, signal driver 360 and memory 365. The image processing circuit 345 is configured to perform the functions of the image renderer 130 and the image rendering apparatus 210.

For example, the processor is configured to perform the functions of the image renderer 130 and the image rendering apparatus 210 by executing instructions stored in the memory 365. The processor 350 then supplies the gate driver 355 and the signal driver 360 with timing of selecting the pixels 332, 334, 336, 338 and 340 and the assigned pixel values.

Figure 4:
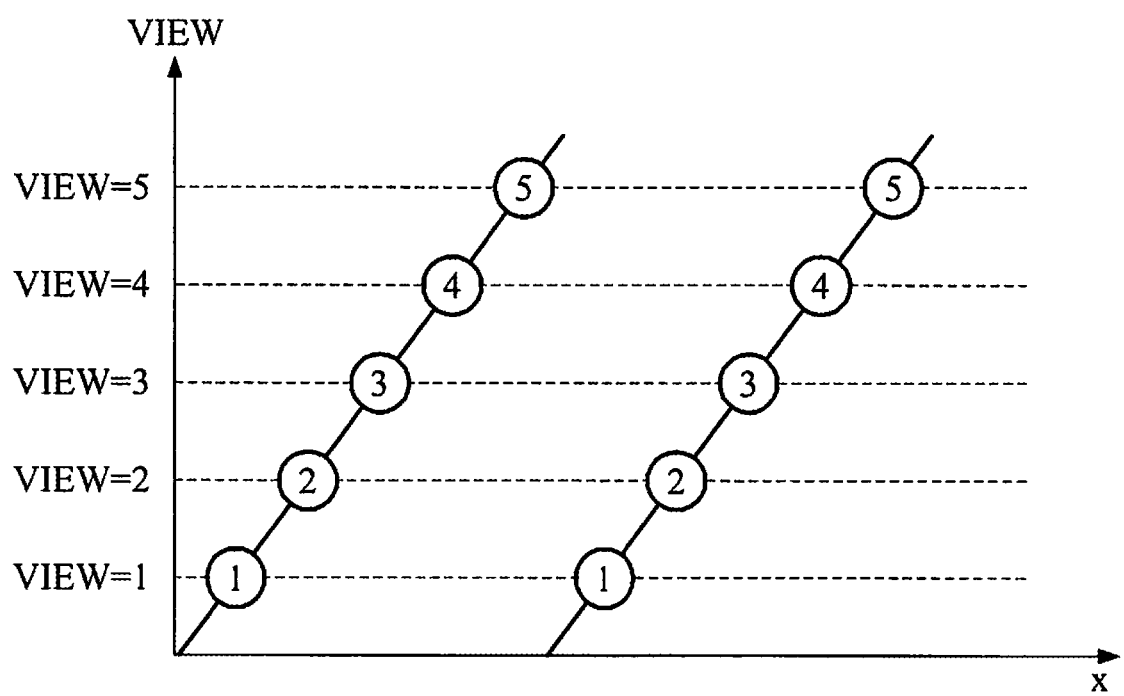
FIGS. 4 and 5 illustrate a first model according to at least one example embodiment.
Figure 5:
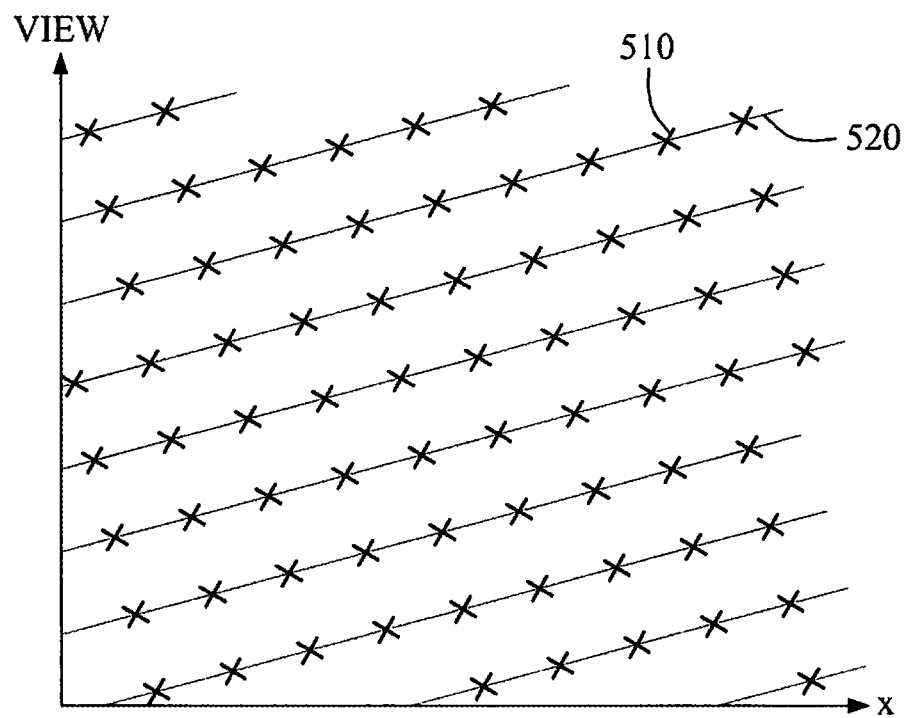

FIGS. 4 and 5 illustrate a first model according to at least one example embodiment.

A first model corresponding to a light field function of a display apparatus may be determined by the image rendering apparatus based on a corresponding relationship between a location and a viewpoint direction of each of display pixels. FIG. 4 illustrates a coordinate plane representing a corresponding relationship between a location and a viewpoint direction of a display pixel. In the coordinate plane of FIG. 4, an x-axis represents the location of the display pixel, and a y-axis represents the viewpoint direction of the display pixel. For convenience of description, a total number of viewpoint directions of a display pixel may be assumed to be "five." However, example embodiments are not limited thereto. In the coordinate plane, a point corresponding to the location and the viewpoint direction of the display pixel may be defined as a reference point.

The first model may be determined based on display pixels arranged in a predetermined and/or selected line. In FIG. 4, ten reference points may represent a corresponding relationship between a location and a viewpoint direction of each of ten display pixels arranged in a row. The reference points may indicate rays expressible by the display apparatus. Because it is difficult for the display apparatus to express all light fields, that is, all rays in the real world, the display apparatus may output rays using a light field with a predetermined and/or desired structure.

FIG. 5 illustrates a light field of a display apparatus for realizing a stereoscopic image using a lenticular lens. In FIG. 5, the light field is indicated by a symbol "x" corresponding to a reference point 510. The light field may be based on a location of a display pixel included in the display apparatus, and a viewpoint location of a ray output from the display pixel. Additionally, in FIG. 5, an x-axis represents a location of each of display pixels located in either a vertical line or a horizontal line in the display apparatus, and a y-axis represents a viewpoint direction of each of the display pixels.

Because the display apparatus uses a subpixel, instead of using infinite display pixels, the light field of the display apparatus may be represented by reference points 510 sampled as indicated by the symbol "x" of FIG. 5. The reference points 510 are based on a viewpoint direction of a display pixel in the display apparatus. An image rendering apparatus may generate a light field of display pixels corresponding to the reference points 510, and may generate a stereoscopic image.

A function $f_{LF}(x)$ of consecutive light fields may be represented by the display apparatus, as shown in Equation 1 below.

$$f_{LF}(x) = \frac{f-D}{f}x + \frac{D}{f}v_n(x) \qquad \text{[Equation 1]}$$

In Equation 1, x denotes a variable used to identify locations of display pixels located in either a vertical line or a horizontal line among display pixels included in the display apparatus. Additionally, $f$ denotes a focal distance of the lenticular lens, and D denotes a viewing distance from the display apparatus. Furthermore, $v_n(x)$ denotes a viewpoint location to which a ray travels from a display pixel at the x location through an n-th lenticule.

For example, the reference point 510 may be represented as shown in Equation 2 below.

$$f_{LF}(i,s) = \text{mod}\left(\frac{f-D}{f}x(s) + \frac{D}{f}v_s(i) + V_L, V\right) + V_R \qquad \text{[Equation 2]}$$

In Equation 2, $f_{LF}(i,s)$ denotes a light field function of a display apparatus having a sampled value. The sampled value may correspond to the reference point 510. Equation 2 may be obtained by redefining Equation 1 based on a viewing region V and a characteristic of the lenticular lens. A light field function of a display apparatus using the lenticular lens may have a discrete form as shown in Equation 2. The viewing region V may refer to a region between a viewing location $V_L$ of a left eye and a viewing location $V_R$ of a right eye, and $f$ denotes a focal distance of the lenticular lens. Additionally, D denotes a viewing distance from the display apparatus, and mod(a, b) denotes a function to output a remainder obtained by dividing "a" by "b."

Furthermore, i denotes a variable used to identify a location of a display pixel included in either a vertical line or a horizontal line among display pixels included in a 3D display apparatus, and may have a value of "1" to "n" that is a natural number. In addition, s denotes a variable with a dimension of "i*3," and may have a value of "1" to "m" that is a natural number, and x(s) denotes a location value of a display pixel based on s. $v_s(i)$ denotes a viewpoint location to which a ray travels from a display pixel i through an s-th lenticule of a lenticular lens. For example, when a lenticular lens is tilted in a diagonal direction, a start point $v_i(s=1)$ of a lenticule may be changed based on i and accordingly, $v_s(i)$ may be represented by a function of i.

A viewpoint direction of each of display pixels may be represented in a predetermined and/or desired pattern based on a location index and a viewpoint index. The location index may be used to identify a display pixel in the display apparatus, and the viewpoint index may be used to identify a viewpoint direction of the display pixel. A pattern representing a viewpoint direction of each of the display pixels based on the location index and the viewpoint index may be defined as a weaving pattern. The weaving pattern may represent a viewpoint direction or a viewpoint location of each of display pixels located in either a vertical line or a horizontal line in the display apparatus. The weaving pattern may have a plurality of reference points, for example the reference points 510, representing a corresponding relationship between a location and a viewpoint direction of a display pixel. Viewpoint directions for each display pixel may be represented in a pattern as shown in FIG. 5, based on periodicity based on a structural characteristic of the lenticular lens.

The image rendering apparatus may determine an intermediate function 520 based on the reference points 510 representing viewpoint directions for each display pixel. The intermediate function 520 may be represented as a function passing through the reference points 510. A first model associated with display pixels may be determined as a plurality of intermediate functions 520 passing through the reference points 510. For example, the image rendering apparatus may determine an intermediate function based on Equation 3 shown below. Based on Equation 3, the intermediate function may be defined as a plurality of linear functions passing through reference points.

$$f_{WP}(s,p,i) = a_{WP}(s - a_p p) + b_{WP}(i) \qquad \text{[Equation 3]}$$

In Equation 3, p denotes a variable used to group weaving patterns as a plurality of linear functions, and may have a value of "1" to "q" that is a natural number. $f_{WP}(s, p, i)$ denotes an intermediate function determined based on a value of each of variables s, p, and i. $a_{WP}$ denotes a slope of the intermediate function $f_{WP}(s, p, i)$, and may be defined as shown in Equation 4 below.

$$a_{WP} = \frac{f_{LF}(i, c + n_{WP}) - f_{LF}(i, n_{WP})}{n_{WP}} \qquad \text{[Equation 4]}$$

In Equation 4, $f_{LF}(i, c+n_{WP})$ corresponds to the light field function $f_{LF}(i,s)$ of Equation 2. c denotes a general constant, and may have a value of "1" to "w" that is a natural number. $n_{WP}$ denotes a distance between reference points that are located adjacent to each other and that are separated from each other in a direction among reference points included in the same intermediate function.

$b_{WP}(i)$ denotes a y-intercept of the intermediate function $f_{WP}(s, p, i)$ based on i, and may be defined as shown in Equation 5 below.

$$b_{WP}(i) = f_{LF}(i,1) - a_{WP} \qquad \text{[Equation 5]}$$

In Equation 5, $f_{LF}(i,1)$ corresponds to the light field function $f_{LF}(i,s)$ of Equation 2. $a_{WP}$ denotes a slope of the intermediate function $f_{WP}(s, p, i)$ determined based on a value of each of variables s, p, and i in Equation 4.

In Equation 3, $a_p$ denotes a distance between intermediate functions adjacent to each other among the intermediate functions 520 represented as the intermediate function $f_{WP}(s, p, i)$. The distance $a_p$ may be defined as shown in Equation 6 below.

$$a_p = \frac{a_{WP}n_{mr} - (f_{LF}(i, c+n_{mr}) - f_{LF}(i, c))}{a_{WP}} \quad \text{[Equation 6]}$$

In Equation 6, $f_{LF}(i,c+n_{mr})$ corresponds to the light field function $f_{LF}(i,s)$ of Equation 2, and $a_{WP}$ denotes a slope of the intermediate function $f_{WP}(s, p, i)$ determined based on a value of each of variables s, p, and i in Equation 4. $n_{mr}$ denotes a distance between start points of intermediate functions based on the variable p in the intermediate function $f_{WP}(s, p, i)$ of Equation 3. For example, when a start point of an intermediate function with the variable p set to "1" is assumed as "a," a start point of an intermediate function with the variable p set to "2" may be "a+$n_{mr}$."

Figure 6:
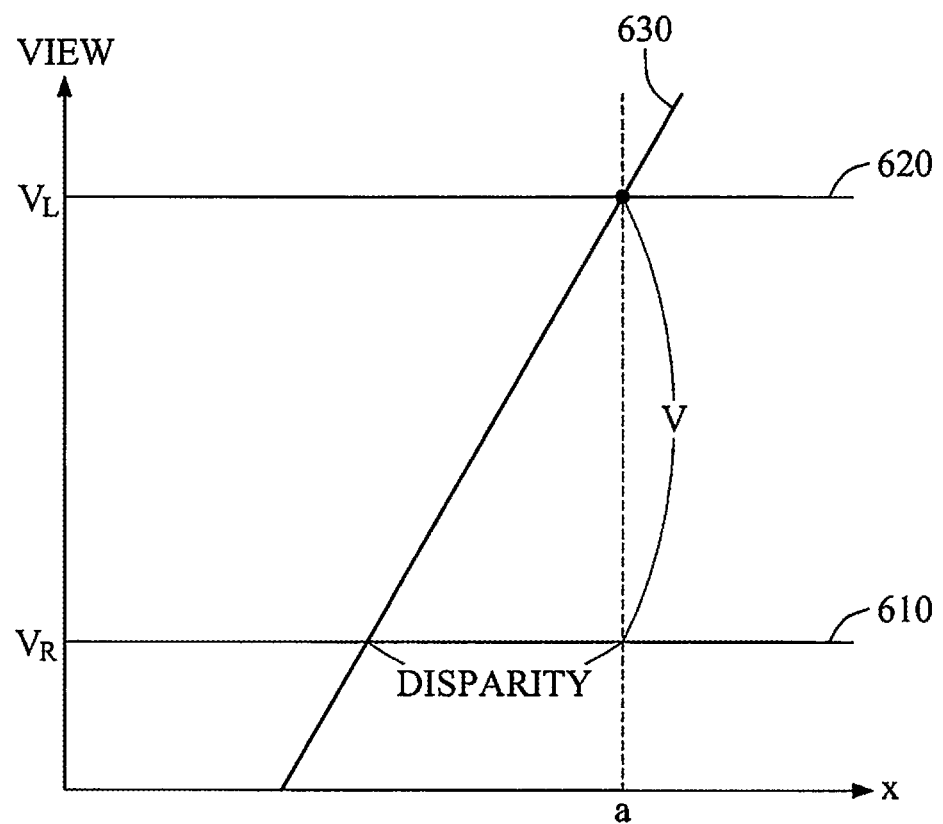
FIG. 6 illustrates a second model according to at least one example embodiment.

FIG. 6 illustrates a second model according to at least one example embodiment.

A camera image acquired by capturing a ray from a predetermined and/or desired viewpoint in a 3D space may be input as an input image to an image rendering apparatus. A light field of the input image may be expressed by various schemes. The light field may be determined by the image rendering apparatus based on a location of an image pixel in the input image and a viewpoint direction of a ray output from the image pixel. The viewpoint direction of the ray may be determined based on a disparity of the image pixel.

When a distance between a left viewpoint and a right viewpoint is assumed as a viewing region V, a light field of an image pixel having a color value and a disparity in the input image may be modeled as a disparity function, that is, a straight line equation that has a slope of "V/disparity" and that passes through an original location of an image. In a coordinate plane of FIG. 6, a disparity function 630 may have a slope of "V/disparity" and is shown as a straight line equation passing through an original location (a, $V_L$) of an image. In FIG. 6, $V_L$ represents a viewpoint location 620 of a left eye in a viewing region, and $V_R$ represents a viewpoint location 610 of a right eye in the viewing region.

The image rendering apparatus may determine a disparity function 630 expressed by an image pixel and a disparity of the image pixel, based on the disparity. A second model of the image pixel may be determined based on the disparity function 630.

For example, the image rendering apparatus may determine a disparity function of an image pixel at a location (i, j), based on Equation 7 shown below.

$$f_D(s, i, j) = \frac{V}{3d(i, j)}(s - 3j) + V_L \quad \text{[Equation 7]}$$

For example, when a distance between a left viewpoint $V_L$ and a right viewpoint $V_R$ is assumed as a viewing region V, and when a left image is input as an input image, the image rendering apparatus may determine, as a disparity function, a straight line equation that has a gradient of the V between disparities in an x direction and that passes through an original location (3j, $V_L$) of an image pixel. In FIG. 6, a is equal to 3j. Equation 7 represents a disparity function of an image pixel at a location (i, j) in the input image. In Equation 7, i denotes a variable used to identify a row location of the image pixel in the input image, and j denotes a variable used to identify a column location of the image pixel in the input image. Additionally, s denotes a variable used to match a dimension of a light field function of a display apparatus when a location of a display pixel is set based on three subpixels (for example, subpixels R, G and B), and may have a dimension of "j*3." d denotes a disparity of the image pixel at the location (i, j).

Figure 7:
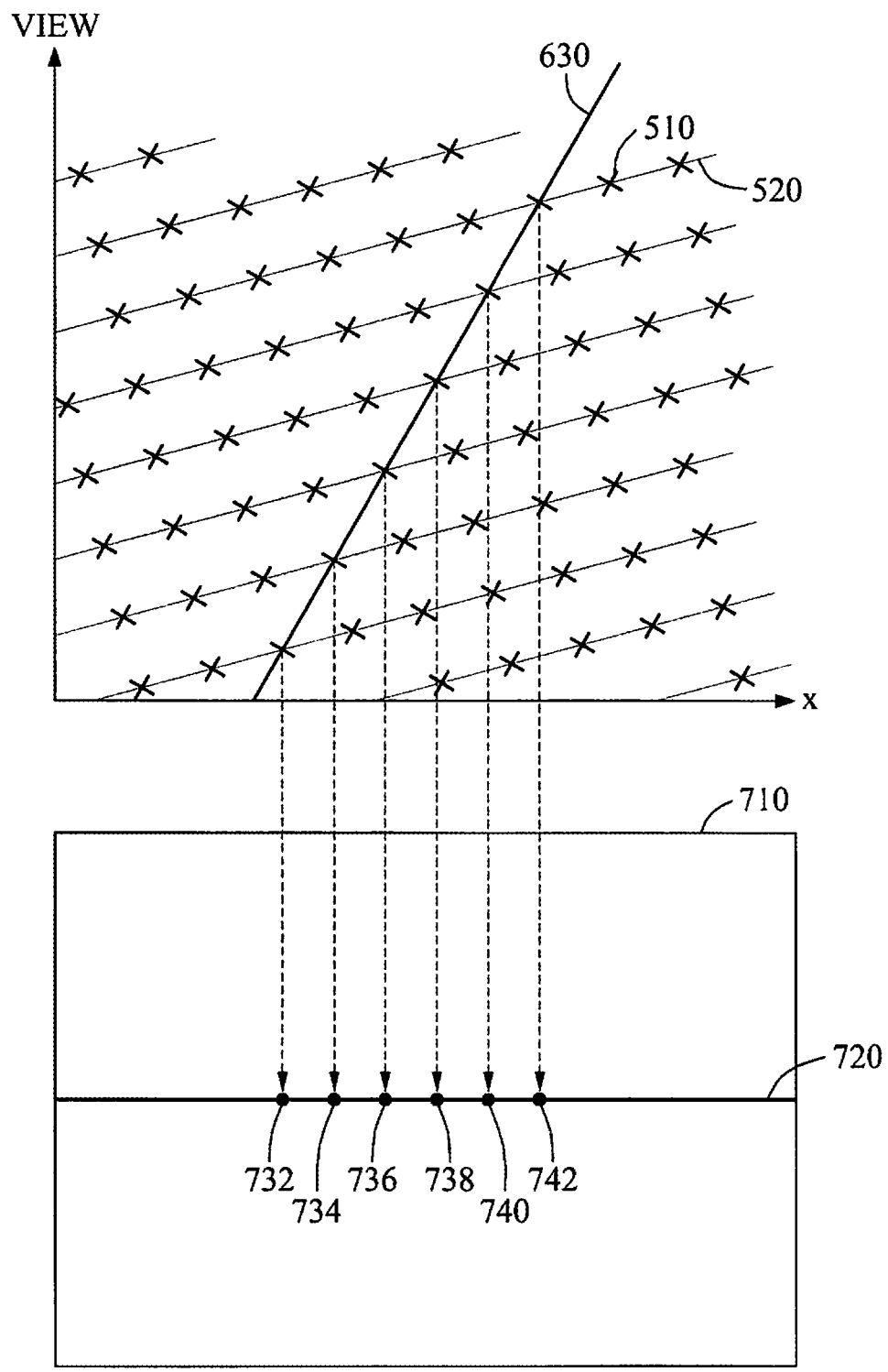
FIG. 7 illustrates an example of a process of rendering a stereoscopic image based on a first model and a second model according to at least one example embodiment.

FIG. 7 illustrates an example of a process of rendering a stereoscopic image based on a first model and a second model according to at least one example embodiment.

An image rendering apparatus may render a stereoscopic image based on a first model associated with display pixels, and a second model associated with an image pixel. The first model may be determined based on reference points representing a corresponding relationship between a location and a viewpoint direction of a display pixel. The second model may be determined based on a disparity function associated with a disparity of the image pixel. The image rendering apparatus may assign a pixel value of the image pixel to one or more display pixels having a viewpoint direction corresponding to a viewpoint direction of the image pixel.

A stereoscopic image 710 to be output through display pixels included in a display panel may be rendered in a unit of lines. Referring to FIG. 7, in the stereoscopic image 710, a first model associated with display pixels corresponding to a location of a line 720 may be determined. The image rendering apparatus may determine the first model based on a location and a viewpoint direction of each of the display pixels located in the line 720. The first model may be determined by intermediate functions 520 determined based on Equations 3 to 6, and the intermediate function 520 may refer to a function to connect reference points 510.

The image rendering apparatus may determine a second model based on a disparity function 630 of one of image pixels at a location corresponding to the line 720. The second model may be determined based on Equation 7.

The image rendering apparatus may determine an intersecting point between each of the intermediate functions 520 and the disparity function 630. The image rendering apparatus may determine a display pixel corresponding to the intersecting point, and may assign a pixel value of an image pixel corresponding to the disparity function 630 to the determined display pixel.

In an example, the image rendering apparatus may determine a reference point located closest to the intersecting point, and may assign a pixel value of an image pixel for the disparity function 630 to a display pixel corresponding to the determined reference point. The image rendering apparatus may repeatedly perform the above process on all intersecting points between the intermediate functions 520 and the disparity function 630. Because the reference points 510 have periodicity due to a structural characteristic of a lenticular lens, a difference between two intersecting points may be used to determine other intersecting points.

In another example, the disparity function 630 may be expressed as a region, and the image rendering apparatus may identify reference points included in the region expressed by the disparity function 630, and may assign a pixel value of an image pixel for the disparity function 630 to a display pixel corresponding to each of the identified reference points.

Referring to FIG. 7, six reference points may correspond to intersecting points between the intermediate functions 520 and the disparity function 630. A pixel value of an image pixel for the disparity function 630 may be assigned to display pixels 732, 734, 736, 738, 740, and 742 that respectively correspond to the six reference points.

For example, a pixel value of an image pixel "A" for the disparity function 630 may be assigned to the display pixels 732, 734, 736, 738, 740 and 742. In this example, a second model associated with an image pixel "B" other than the image pixel "A" among image pixels at the location corresponding to the line 720 may be determined, and a display pixel to which a pixel value of the image pixel "B" is to be assigned may be determined based on the first model and the second model. The second model may be determined based on an estimated disparity of the image pixel "B."

When the above process is performed on the image pixels at the location corresponding to the line 720, the image rendering apparatus may determine a first model associated with display pixels located in a next line of the line 720, and may continuously reperform the above process on image pixels at a location corresponding to the next line. Accordingly, the image rendering apparatus may directly render a stereoscopic image by directly mapping a pixel value of each of image pixels in an input image to a display pixel, without a need to generate a multiview image. Additionally, an amount of resources and computation required for rendering of the stereoscopic image may be significantly reduced.

Figure 8:
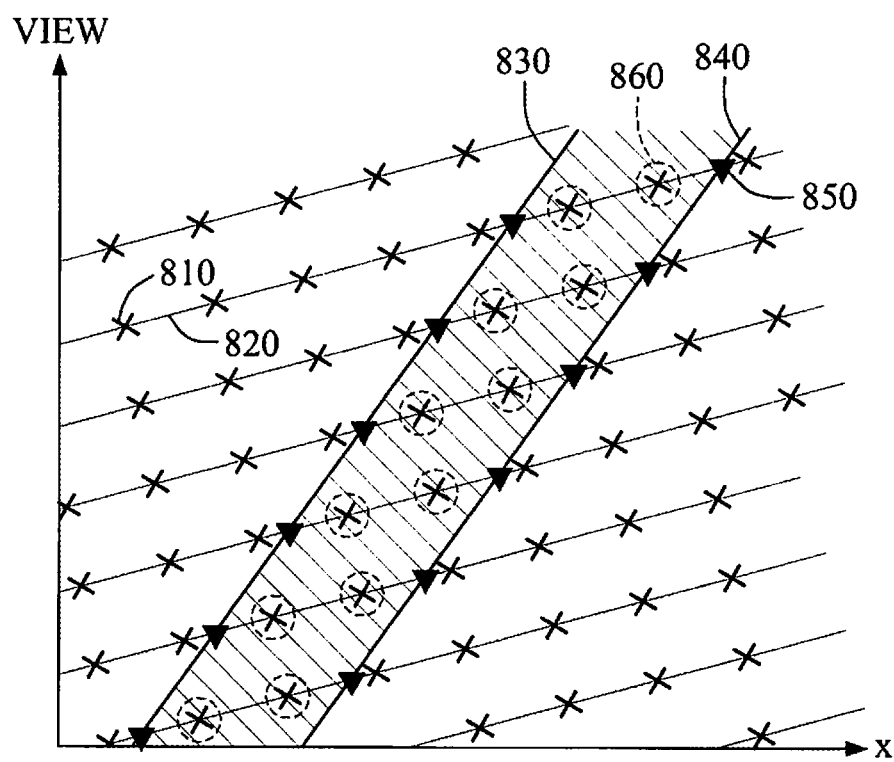
FIG. 8 illustrates another example of a process of rendering a stereoscopic image based on a first model and a second model according to at least one example embodiment.

FIG. 8 illustrates another example of a process of rendering a stereoscopic image based on a first model and a second model according to at least one example embodiment.

An image rendering apparatus may render a stereoscopic image based on a plurality of second models associated with a plurality of image pixels. The image rendering apparatus may determine a display pixel to which a pixel value of each of the image pixels is to be assigned, based on the second models. In the example of FIG. 8, a plurality of disparity functions corresponding to image pixels adjacent to each other, for example disparity functions 830 and 840, may be used. The disparity function 830 may correspond to a single image pixel, and the disparity function 840 may correspond to an image pixel adjacent to the image pixel. The image rendering apparatus may determine a display pixel to which a pixel value of each of the image pixels is to be assigned, based on a region between the disparity functions 830 and 840.

The image rendering apparatus may determine an intermediate function 820, based on a reference point 810 representing a corresponding relationship between a location and a viewpoint direction of a display pixel, and may determine a display pixel to which a pixel value of each of the image pixels is to be assigned, based on the intermediate function 820 and the disparity functions 830 and 840. The image rendering apparatus may interpolate pixel values of the image pixels, and may assign a pixel value obtained by interpolating the pixel values to the determined display pixel.

For example, the intermediate function 820 including reference points 810 may be determined based on Equation 3, and the disparity functions 830 and 840 may be determined based on Equation 7. The image rendering apparatus may determine reference points 860 of the intermediate function 820 included in the region between the disparity functions 830 and 840. The image rendering apparatus may interpolate pixel values of image pixels corresponding to the disparity functions 830 and 840, and may assign a pixel value obtained by interpolating the pixel values to display pixels corresponding to the reference points 860. When the disparity functions 830 and 840 correspond to image pixels "A" and "B," respectively, a pixel value of the image pixel "A" and a pixel value of the image pixel "B" may be interpolated, and a pixel value obtained by interpolating the pixel values may be assigned to a display pixel corresponding to the reference point 860. The image rendering apparatus may perform the above process on the other display pixels and the other image pixels.

Figure 9:
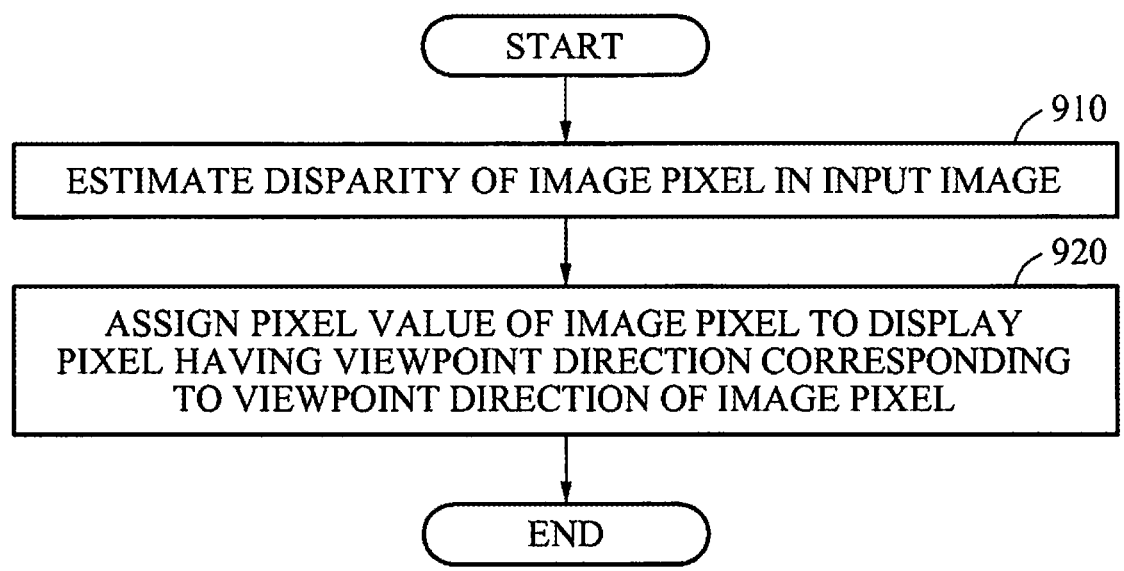
FIG. 9 illustrates an image rendering method according to at least one example embodiment.

FIG. 9 illustrates an image rendering method according to at least one example embodiment.

Referring to FIG. 9, in operation 910, an image rendering apparatus may estimate a disparity of an image pixel included in an input image. Based on the disparity, a viewpoint direction of the image pixel may be determined. In an example, the image rendering apparatus may estimate the disparity based on a difference in viewpoint between the input image and a reference image that are captured from different viewpoints. The image rendering apparatus may search for image pixels corresponding to the reference image from among all image pixels included in the input image, may calculate a distance between corresponding image pixels in the input image and the reference image, and may estimate the disparity. In another example, the image rendering apparatus may estimate the disparity based on depth information included in a depth image.

In operation 920, the image rendering apparatus may assign a pixel value of the image pixel to one or more display pixels, and may render a stereoscopic image. Each of the display pixels may have a viewpoint direction corresponding to the viewpoint direction of the image pixel. The display pixels may each have a predetermined and/or desired viewpoint direction, or may have one of a predetermined number of different viewpoint directions. A viewpoint direction of each of the display pixels may be determined based on a structural characteristic of a lenticular lens included in a display apparatus for displaying a stereoscopic image.

The image rendering apparatus may search for display pixels to which the pixel value of the image pixel is to be assigned from among a plurality of display pixels, based on a viewpoint direction of each of the image pixel and the display pixels. The image rendering apparatus may directly render a stereoscopic image, based on a first model associated with a viewpoint direction of each of the display pixels and a second model associated with the viewpoint direction of the image pixel, instead of using a multiview image.

The image rendering apparatus may determine the first model, based on a corresponding relationship between a location of each of display pixels arranged in a display panel and a viewpoint direction assigned to each of the display pixels. Additionally, the image rendering apparatus may set a plurality of reference points representing a corresponding relationship between a location and a viewpoint direction of a display pixel, may determine an intermediate function passing through the set reference points, and may determine the first model.

The image rendering apparatus may determine the second model based on the disparity of the image pixel. The image rendering apparatus may perform modeling of a direction of a ray to be output from the image pixel based on a location of the image pixel in the input image, and may determine the second model. The image rendering apparatus may determine, as the second model, a disparity function associated with a viewpoint direction of the ray output from the image pixel.

The image rendering apparatus may determine one or more display pixels to which the pixel value of the image pixel is to be assigned, based on the first model and the second model. For example, the image rendering apparatus may determine a display pixel to which a pixel value of an image pixel is to be assigned, based on a corresponding relationship between the first model and the second model, may assign a pixel value of a predetermined and/or selected image pixel for the second model to the determined display pixel, and may render a stereoscopic image.

In an example, the image rendering apparatus may determine one or more display pixels to which a pixel value of an image pixel is to be assigned, based on a first model and a second model that is associated with a single image pixel. The image rendering apparatus may determine an intersecting point between an intermediate function and a disparity function, and may determine one or more display pixels to which the pixel value is to be assigned, based on the intersecting point. In this example, the image rendering apparatus may determine a reference point located closest to the intersecting point among reference points included in the intermediate function, and may assign the pixel value to a display pixel corresponding to the determined reference point. Alternatively, the image rendering apparatus may identify a reference point included in a pixel region determined based on the disparity of the image pixel, and may assign the pixel value to a display pixel corresponding to the identified reference point.

In another example, the image rendering apparatus may determine one or more display pixels to which a pixel value of each of a plurality of image pixels is to be assigned, based on a first model, and second models associated with the image pixels. The image pixels may be located adjacent to each other. The image rendering apparatus may determine a display pixel to which the pixel value is to be assigned, based on a disparity function of each of the image pixels. The image rendering apparatus may set a plurality of reference points representing a corresponding relationship between a location and a viewpoint direction of a display pixel, and may determine an intermediate function passing through the reference points. The image rendering apparatus may determine a disparity function of each of the image pixels. The image rendering apparatus may identify a reference point of the intermediate function included in a region between a plurality of disparity functions, may interpolate pixel values of the image pixels, and may assign a pixel value obtained by interpolating the pixel values to a display pixel corresponding to the identified reference point.

The units and/or modules described herein may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image rendering method for rendering an image to be displayed by a display panel of a display apparatus including a plurality of display pixels, the image rendering method comprising:
   estimating a disparity of a selected image pixel included in an input image;
   determining a ray direction of the selected image pixel based on the estimated disparity; and generating an image to be output through the display panel by assigning a pixel value of the selected image pixel to a selected display pixel of the plurality of display pixels based on the determined ray direction without using a multiview image, the selected display pixel having a display ray direction corresponding to the determined ray direction of the selected image pixel, wherein the assigning includes, obtaining a first model associated with display ray directions of the plurality of display pixels, the display ray direction of the selected display pixel being one of the display ray directions of the plurality of display pixels, and obtaining a second model associated with the determined ray direction of the selected image pixel and the estimated disparity, the assigning being based on the obtained first model and the obtained second model.

2. The image rendering method of claim 1, wherein the first model is based on a relationship between the display ray directions of the display pixels and corresponding locations of the plurality of display pixels.

3. The image rendering method of claim 1, wherein the obtaining obtains the second model by modeling a direction of a ray to be output from the selected image pixel based on a location of the selected image pixel in the input image.

4. The image rendering method of claim 1 wherein the assigning comprises:

identifying one of the plurality of display pixels having a same display ray direction as the determined ray direction of the selected image pixel based on a relationship between the obtained first model and the obtained second model, and the assigning assigns the pixel value of the selected image pixel to the identified display pixel.

5. The image rendering method of claim 1, wherein the selected image pixel is one of a plurality of image pixels and the assigning comprises:

obtaining second models associated with a plurality of determined ray directions of the plurality of the image pixels, respectively, the determined ray direction being one of the plurality of determined ray directions, and the assigning is based on the obtained first model and the obtained second models.

6. The image rendering method of claim 5, wherein the assigning comprises:

interpolating pixel values of the plurality of image pixels and assigning one of the interpolated pixel values to the selected display pixel.

7. The image rendering method of claim 1, wherein each of the plurality of display pixels has one of a number of different display ray directions.

8. The image rendering method of claim 1, wherein the display ray direction of the selected display pixel is based on a structural characteristic of a lenticular lens in the display apparatus.

9. The image rendering method of claim 1, wherein the estimating comprises estimating the disparity of the selected image pixel based on depth information included in a depth image associated with the input image.

10. The image rendering method of claim 1, wherein the estimating comprises estimating the disparity of the selected image pixel based on a difference the input image and a reference image from the input image.

11. A non-transitory computer readable recording medium storing a program that, when executed on a computer configures the computer to perform the method of claim 1.

12. A display apparatus, comprising:

a display configured to display an image to be output through a display panel of the display using a plurality of display pixels of the display panel, each of the plurality of display pixels having a corresponding display ray direction; and an image renderer configured to generate the image, without using a multiview image, by assigning a pixel value of a selected image pixel in an input image to a selected display pixel of the plurality of display pixels based on a determined ray direction of the selected image pixel and the corresponding display ray direction of the selected display pixel, wherein the assigning the pixel value includes, obtaining a first model associated with display ray directions of the plurality of display pixels, the display ray direction of the selected display pixel being one of the display ray directions of the plurality of display pixels, and obtaining a second model associated with the determined ray direction of the selected image pixel, the assigning being based on the obtained first model and the obtained second model.

13. The display apparatus of claim 12, wherein the image renderer is configured to determine the selected display pixel using the first model associated with the display ray directions corresponding to the plurality of display pixels, and a the second model associated with the determined ray direction of the selected image pixel.

14. The display apparatus of claim 13, wherein the selected image pixel is one of a plurality of image pixels, the second model associated with the determined ray direction of the selected image pixel is one of a plurality of second models associated with the plurality of image pixels, and the image renderer is configured to determine the selected display pixel using the first model and the plurality of second models, and the image pixels are located adjacent to each other.

15. The display apparatus of claim 12, wherein the image renderer is configured to estimate a disparity of the selected image pixel based on a difference in between the input image and a reference image, and wherein the determined ray direction of the selected image pixel is based on the estimated disparity.

16. The display apparatus of claim 12, wherein the image renderer is configured to estimate a disparity of the selected image pixel based on depth information included in a depth image associated with the input image, and the determined ray direction of the selected image pixel is based on the estimated disparity.

17. The display apparatus of claim 12, wherein the display comprises a lenticular lens above the plurality of display pixels, and the corresponding display ray direction of the selected display pixel is based on the lenticular lens.

18. An image rendering apparatus, comprising:

a disparity estimator configured to estimate a disparity of a selected image pixel included in an input image; and an image renderer configured to generate an image to be output through a display panel by determining a ray direction of the selected image pixel based on the estimated disparity and assigning a pixel value of the selected image pixel to a selected display pixel of a plurality of display pixels based on the determined ray direction without using a multiview image, the selected display pixel having a display ray direction corresponding to determined ray direction of the selected image pixel,
wherein the assigning a pixel value includes,
  obtaining a first model associated with display ray directions of the plurality of display pixels, the display ray direction of the selected display pixel being one of the display ray directions of the plurality of display pixels, and
  obtaining a second model associated with the determined ray direction of the selected image pixel and the estimated disparity, the assigning being based on the obtained first model and the obtained second model.

19. The image rendering apparatus of claim 18, wherein the image renderer is configured to search the plurality of display pixels to which the pixel value of the selected image pixel is to be assigned based on the determined ray direction of the selected image pixel and the display ray direction.

20. The method of claim 1, where the assigning directly assigns the pixel value to the selected display pixel.

21. The display apparatus of claim 12, wherein the image renderer is configured to directly assign the pixel value to the selected display pixel.

22. A display apparatus comprising:
  a display including a plurality of display pixels; and
  a processor configured to obtain a first model associated with locations and display ray directions of the plurality of display pixels, receive image data for corresponding image pixels, obtain a second model associated with a disparity of at least one of the image pixels, determine at least one intersection of the first model and the second model and apply a display value of the at least one of the image pixels to at least one of the plurality of display pixels based on the at least one intersection.

23. The display apparatus of claim 22, wherein the processor is configured to generate a 3D display based on the display value.

24. The display apparatus of claim 22, wherein
  the second model is a singular linear function; and
  the processor is configured to apply the singular linear function to the first model, determine at least one intersection of the first model and the singular linear function, and apply the display value based on the at least one intersection.

25. The display apparatus of claim 24, wherein the at least one intersection is associated with one of the plurality of display pixels.

26. The display apparatus of claim 22, wherein the first model includes a plurality of intermediate functions, each intermediate function is associated with one of the display ray directions.

27. The display apparatus of claim 22, wherein the processor is configured to assign the display value without generating a multiview image.

* * * * *